United States Patent
Lehman et al.

(10) Patent No.: US 9,760,641 B1
(45) Date of Patent: Sep. 12, 2017

(54) SITE QUALITY SCORE

(71) Applicant: Google Inc., Mountain View, CA (US)

(72) Inventors: April R. Lehman, Mountain View, CA (US); Navneet Panda, Mountain View, CA (US)

(73) Assignee: Google Inc., Mountain View, CA (US)

( * ) Notice: Subject to any disclaimer, the term of this patent is extended or adjusted under 35 U.S.C. 154(b) by 73 days.

(21) Appl. No.: 14/709,159

(22) Filed: May 11, 2015

Related U.S. Application Data

(63) Continuation of application No. 13/535,308, filed on Jun. 27, 2012, now Pat. No. 9,031,929.

(60) Provisional application No. 61/583,602, filed on Jan. 5, 2012.

(51) Int. Cl.
*G06F 17/30* (2006.01)

(52) U.S. Cl.
CPC .... *G06F 17/30867* (2013.01); *G06F 17/3053* (2013.01)

(58) Field of Classification Search
CPC .................................................. G06F 17/30867
See application file for complete search history.

(56) References Cited

U.S. PATENT DOCUMENTS

| | | |
|---|---|---|
| 6,421,675 B1 | 7/2002 | Ryan et al. |
| 7,603,350 B1 | 10/2009 | Guha |
| 7,668,822 B2 | 2/2010 | Kaul et al. |
| 7,797,344 B2 | 9/2010 | Kaul et al. |
| 7,836,050 B2 | 11/2010 | Jing et al. |
| 7,844,590 B1 | 11/2010 | Zwicky et al. |
| 8,041,729 B2 | 10/2011 | Vandelle et al. |
| 8,041,733 B2 | 10/2011 | Rouhani-Kalleh |
| 8,260,771 B1 | 9/2012 | Ortega et al. |
| 8,442,984 B1 | 5/2013 | Pennock et al. |
| 8,612,424 B2 | 12/2013 | Dasdan et al. |
| 2005/0222987 A1 | 10/2005 | Vadon |
| 2005/0240576 A1 | 10/2005 | Piscitello et al. |
| 2006/0064411 A1 | 3/2006 | Gross et al. |
| 2007/0203869 A1 | 8/2007 | Ramsey et al. |
| 2010/0257171 A1 | 10/2010 | Shekhawat |
| 2011/0119267 A1 | 5/2011 | Forman et al. |
| 2013/0097146 A1 | 4/2013 | Lanphear et al. |
| 2013/0132433 A1 | 5/2013 | Ozertem et al. |

FOREIGN PATENT DOCUMENTS

WO 2012/052983 4/2012

*Primary Examiner* — Kris Mackes
(74) *Attorney, Agent, or Firm* — Fish & Richardson P.C.

(57) ABSTRACT

Methods, systems, and apparatus, including computer programs encoded on computer storage media, for determining a first count of unique queries, received by a search engine, that are categorized as referring to a particular site; determining a second count of unique queries, received by the search engine, that are associated with the particular site, wherein a query is associated with the particular site when the query is followed by a user selection of a search result that (a) was presented, by the search engine, in response to the query and (b) identifies a resource in the particular site; and determining, based on the first and second counts, a site quality score for the particular site.

24 Claims, 3 Drawing Sheets

300

Determine a count of user selections of search results that were presented in response to queries that are categorized as being directed to a particular site  *302*

Determine a count of user selections of search results that identify resources in the particular site  *304*

Determine a site quality score for the particular site  *306*

SITE QUALITY SCORE

CROSS-REFERENCE TO RELATED APPLICATIONS

This is a continuation of U.S. application Ser. No. 13/535,308, filed Jun. 27, 2012, which claims the benefit under 35 U.S.C. §119(e) of U.S. Provisional Application No. 61/583,602, filed on Jan. 5, 2012. The disclosures of the prior applications are considered part of and are incorporated by reference in the disclosure of this application.

BACKGROUND

This specification relates to ranking search results of search queries submitted to an Internet search engine.

Internet search engines aim to identify resources, e.g., web pages, images, text documents, multimedia content, that are relevant to a user's information needs and to present information about the resources in a manner that is most useful to the user. Internet search engines generally return a set of search results, each identifying a respective resource, in response to a user-submitted query.

SUMMARY

This specification describes how a system can determine a score for a site, e.g., a web site or other collection of data resources, as seen by a search engine, that represents a measure of quality for the site. The score is determined from quantities indicating user actions of seeking out and preferring particular sites and the resources found in particular sites. A site quality score for a particular site can be determined by computing a ratio of a numerator that represents user interest in the site as reflected in user queries directed to the site and a denominator that represents user interest in the resources found in the site as responses to queries of all kinds. The site quality score for a site can be used as a signal to rank resources, or to rank search results that identify resources, that are found in one site relative to resources found in another site.

In general, one innovative aspect of the subject matter described in this specification can be embodied in methods that include the actions of determining a first count of unique queries, received by a search engine, that include a reference to a particular site; determining a second count of unique queries, received by the search engine, that are associated with the particular site, wherein a query is associated with the particular site when the query is followed by a user selection of a search result that (a) was presented, by the search engine, in response to the query and (b) identifies a resource in the particular site; and determining, based on the first and second counts, a site quality score for the particular site.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. A query includes a reference to the particular site when the query includes a site label identifying the particular site. A query includes a reference to the particular site when the query includes a term that has been determined to be a term that refers to the particular site. A query includes a reference to the particular site when the query is a query that has been determined to be a navigational query to the particular site. The user selection of a search result is an action received from a user that causes the resource identified by the search result to be presented, at least in part, to the user. Determining the site quality score comprises computing a ratio of a numerator and a denominator, wherein the numerator is based on the first count, and wherein the denominator is based on the second count. The numerator is based on the first count reduced by a threshold value. The numerator is a maximum of (a) a lower-bound value and (b) the first count reduced by a threshold value. The denominator is based on the second count raised to a power that is greater than zero and less than one. The denominator is a sum of a base value plus the second count raised to a power that is greater than zero and less than one.

In general, another innovative aspect of the subject matter described in this specification can be embodied in methods that include the actions of determining a first count of user selections, received by a search engine, of search results that were presented in response to queries that are categorized as referring to a particular site; determining a second count of user selections, received by the search engine, of search results that identify resources in the particular site; and determining, based on the first and second counts, a site quality score for the particular site.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can optionally include one or more of the following features. A query includes a reference to the particular site when the query includes a site label identifying the particular site. A query includes a reference to the particular site when the query includes a term that has been determined to be a term that refers to the particular site. A query includes a reference to the particular site when the query is a query that has been determined to be a navigational query to the particular site. The user selection of a search result is an action received from a user that causes the resource identified by the search result to be presented, at least in part, to the user. Determining the site quality score comprises computing a ratio of a numerator and a denominator, wherein the numerator is based on the first count, and wherein the denominator is based on the second count. The numerator is based on the first count reduced by a threshold value. The numerator is a maximum of (a) a lower-bound value and (b) the first count reduced by a threshold value. The denominator is based on the second count raised to a power that is greater than zero and less than one. The denominator is a sum of a base value plus the second count raised to a power that is greater than zero and less than one.

The subject matter described in this specification can be implemented in particular embodiments so as to realize one or more of the following advantages. Site quality scores representing a measure of quality for sites, e.g., web sites, can be computed. The site quality scores can be used to rank search results according to the web sites in which the resources identified by the results are found. A site quality score for a site can be used as a term in the computation of scores for resources that are in the site. A high site quality score for a particular site can be used to determine how other attributes are used to score resources in that site.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
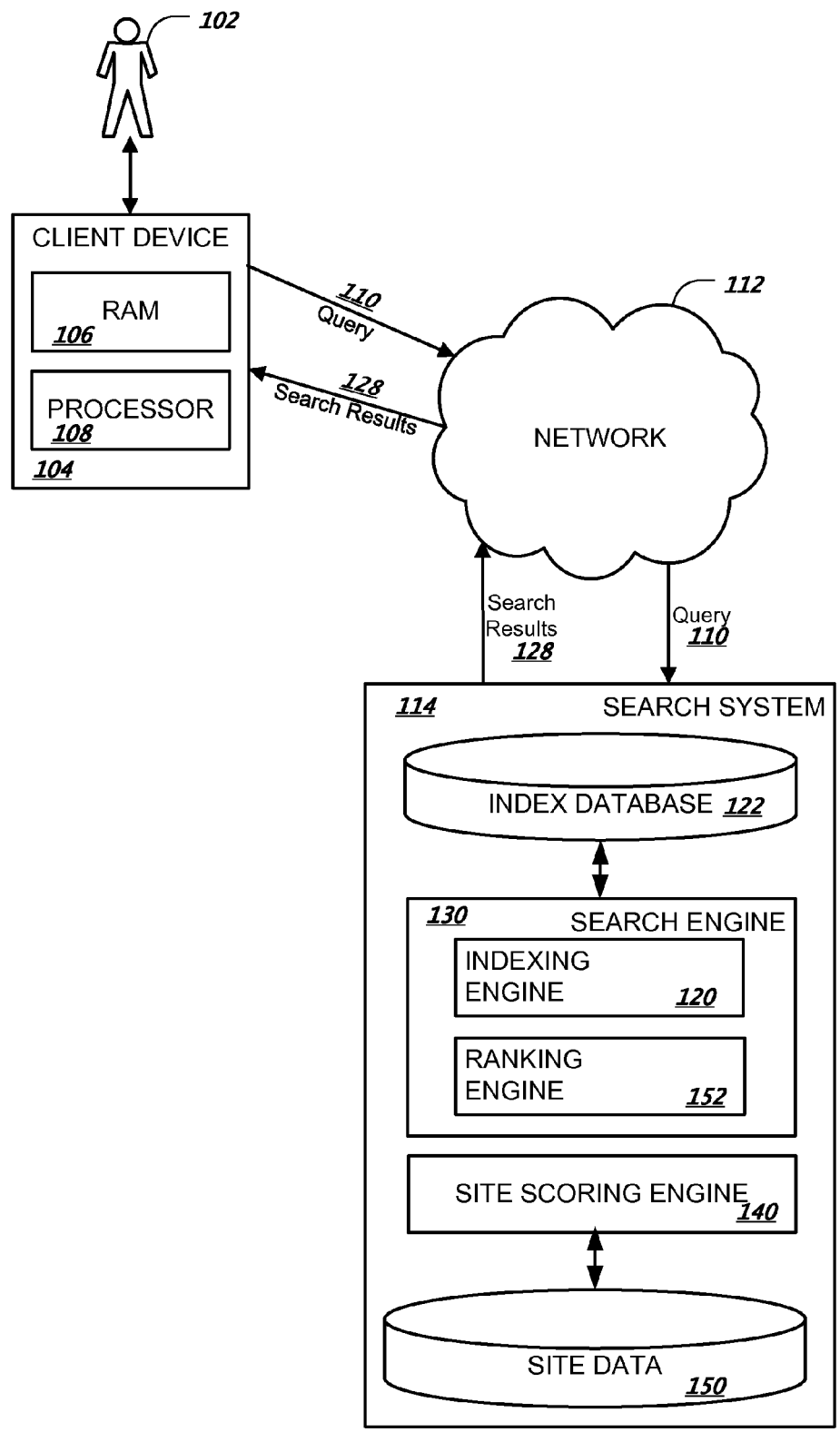
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a user device 104. For example, the user device 104 can be a computer coupled to the search system 114 through a data communication network 112, e.g., a local area network (LAN) or wide area network (WAN), e.g., the Internet, or a combination of networks. In some cases, the search system 114 can be implemented on the user device 104, for example, if a user installs an application that performs searches on the user device 104. The user device 104 will generally include a memory, e.g., a random access memory (RAM) 106, for storing instructions and data and a processor 108 for executing stored instructions. The memory can include both read only and writable memory. For example, the user device 104 can be a personal computer of some kind, a cloud client device, a smartphone, or a personal digital assistant. The user device 104 can run an application program, e.g., a web browser, that can interact with the search system 114 to display web pages that provide a user interface to the search system 114 for the user 102 of the user device 104.

A user 102 can use the user device 104 to submit a query 110 to a search system 114. A search engine 130 within the search system 114 performs the search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the user device 104 for presentation to the user 102, e.g., as a search results web page to be displayed by a web browser running on the user device 104.

In this specification, the term "database" will be used broadly to refer to any collection of data: the data does not need to be structured in any particular way, or structured at all, and it can be stored on storage devices in one or more locations. Thus, for example, the index database 122 can include multiple collections of data, each of which may be organized and accessed differently. Similarly, in this specification the term "engine" will be used broadly to refer to a software-based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources on the Internet and uses an index database 122 to store the index information, and a ranking engine 152 or other software that generates scores for the resources that satisfy the query 110 and that ranks the resources according to their respective scores.

The search system 114 can include, and can communicate with, a site scoring engine 140 that can generate site quality scores for sites. The site scoring engine 140 can generate site quality scores based at least in part on site data 150.

Site data 150 includes data that the system has that includes or describes queries that were submitted to the system by users. Queries that include a reference to a particular site are of particular interest. Such queries will be referred to as "site queries." The system can categorize queries as ones that refer to a particular site in a number of ways. For example, a query can be categorized as referring to a particular site if the query includes a site label that identifies the particular site. A site label identifying a particular site can be specified using an operator, e.g., a "site:" operator, followed by a name, e.g., a domain name, for the particular site. Queries that refer to a particular site can be used to request resources that are in the particular site. For example, a query "san francisco site:www.example.com" can be used to request resources responsive to the query "san francisco" that are in the site www.example.com.

In addition or in the alternative, a query can be categorized as referring to a particular site if the query includes a term that has been determined to be a term that refers to the particular site. For example, if the search system has data indicating that the terms "example sf" and "esf" are commonly used by users to refer to a site "sf.example.com," queries that contain the terms "example sf" or "esf", e.g., the queries "example sf news" and "esf restaurant reviews," can be counted as queries that refer to the site "sf.example.com."

In addition or in the alternative, a query can be categorized as referring to a particular site when the query has been determined to be a navigational query to the particular site. From the user point of view, a navigational query is a query that is submitted in order to get to a single, particular web site or web page of a particular entity. For a search engine, this is a matter of inference. For example, a search system can determine that a query is a navigational query to a particular site when a search result linked to the particular site has received at least a threshold percentage of the user selections that were received for all search results that are responsive to the query.

Figure 2:
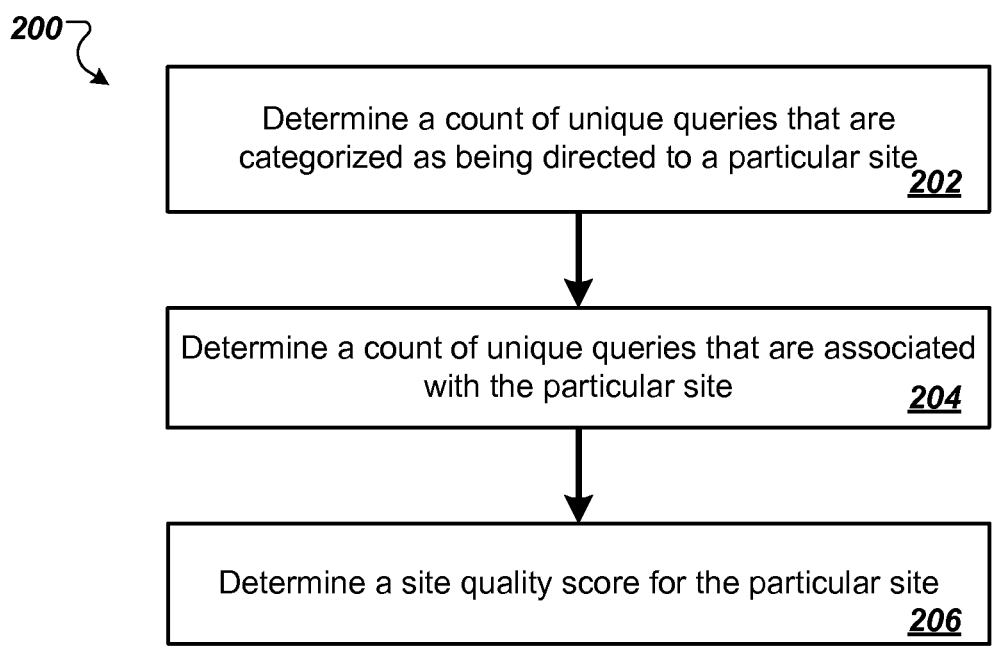
FIG. 2 is a flow diagram of an example process for determining a site quality score.

FIG. 2 is a flow diagram of an example process for determining a site quality score. For convenience, the process 200 will be described as performed by a system including one or more computing devices. For example, a search system 114, as described in reference to FIG. 1, can be used to perform the process 200.

The system determines a count of unique queries that are categorized as referring to a particular site (202). The count can be for a particular time window to a current time, e.g., all queries received by the system in the preceding day, two days, week or month, for example, or over all query data available to the system.

In some implementations, all queries that contain the same query terms, regardless of order, are counted as a single unique query. For example, in such implementations, multiple queries "san francisco site:example.com" and "francisco san site:example.com" are counted as one unique query.

In some other implementations, order matters. For example, multiple queries for "san francisco site:example.com" are counted as one unique query whereas multiple queries for "francisco san site:example.com" are counted as a different unique query. Optionally, the placement of the site label within the query can be ignored.

Additionally, the system can use user information or user device information when counting unique queries. For example, the same query can be counted as two unique queries if it is identified as having been submitted by two different users. In this context, whether a query is the same query can be determined with or without regard to the order of the query terms, as described above. The system can identify a user based on, e.g., a user being logged into a user account, an Internet protocol address associated with the user device being used by user, or by using information provided by the user device, e.g., an Internet cookie.

User information that is used to identify unique users, unique addresses, or other user-related history can be anonymized so that the privacy of users is protected. For example, quasi-unique identifiers can be associated with users, but the actual identifying information of the users may not be stored.

The system determines a count of unique queries that are associated with the particular site (204). The system can associate a particular query with a particular site when a search result that was presented in response to the particular query identifies a resource in the particular site, where the search result has received a user selection. For example, a particular query "example restaurant reviews" can be associated with a particular site "example.com" when a user selects a search result that was presented in response to the particular query, where the search result identifies a resource in the particular site, e.g., "http://example.com/resource".

The system determines a site quality score for the particular site (206). The site quality score can be determined by computing a ratio of a numerator and a denominator, where the numerator is based on the count of unique queries that are categorized as referring to the particular site, and where the denominator is based on the count of unique queries that are associated with the particular site. One example of such a ratio can be expressed as:

$$S/U$$

where S is the count of unique queries that are categorized as referring to the particular site, and where U is the count of unique queries that are associated with the particular site.

A site quality score can also be determined by computing a ratio of a numerator and a denominator, where the numerator is based on the count of unique queries that are categorized as referring to the particular site reduced by a threshold value, and where the denominator is based on the count of unique queries that are associated with the particular site. One example of such a ratio can be expressed as:

$$S-T/U$$

where T is the threshold value, e.g., a number from 1 to 30, e.g., 2, 3, 5, 10, 20 or 30. The value may be determined empirically according to the uses that will be made of the score.

A site quality score can also be determined by computing a ratio of a numerator and a denominator, where the numerator is based on a maximum of (a) a lower-bound value L, e.g., zero, and (b) the count of unique queries that are categorized as referring to a particular site reduced by a threshold value, and where the denominator is based on the count of unique queries that are associated with the particular site. One example of such a ratio can be expressed as:

$$\max(L,S-T)/U.$$

Optionally, the effect of the denominator, or of U, the count of unique queries, can be dampened, e.g., by being raised to a power n between 0.0 and 1.0, e.g., the power 0.5, 0.0.6, 0.7, 0.75, 0.8, or 0.9. One example of this is:

$$\frac{S}{U^n}.$$

A site quality score can also be determined by computing a ratio of a numerator and a denominator, where the numerator is based on the count of unique queries that are categorized as referring to a particular site, and where the denominator is based on a sum of a base value B that is greater than zero, e.g., 1, 2, 5, 10, 15, 20, 50, or 100, plus a term based on the count of unique queries that are associated with the particular site. One example of such a ratio can be expressed as:

$$\frac{S}{(B+U^n)}.$$

A site quality score can also be determined by computing a ratio of a numerator and a denominator, where the numerator is based on a maximum of (a) a lower-bound value L, and (b) the count of unique queries that are categorized as referring to a particular site reduced by a threshold value T, and where the denominator is based on a sum of a base value B plus the count of unique queries that are associated with the particular site raised to a power n, which parameters have been described above. One example of such a ratio can be expressed as:

$$\frac{\max(L, S-T)}{(B+U^n)}.$$

The system can be configured to treat different kinds of collections of resources as a site. For example, a site can be defined operationally as a collection of resources that are hosted on a particular server. In that case, resources in a site can be accessed through a network, e.g., the Internet, using an Internet address, e.g., a Uniform Resource Locator (URL), corresponding to a server on which the site is hosted. Alternatively or in addition, a site can be defined operationally as the resources in a domain, e.g., "example.com," where the resources in the domain, e.g., "host.example.com/resource1," "www.example.com/folder/resource2," or "example.com/resource3," are in the site. Alternatively or in addition, a site can be defined operationally using a subdomain, e.g., "www.example.com," where the resources in the subdomain, e.g., "www.example.com/resource1" or "www.example.com/folder/resource2," are in the site. Alternatively or in addition, a site can be defined operationally using a subdirectory, e.g., "example.com/subdirectory,", where the resources in the subdirectory, e.g., "example.com/subdirectory/resource.html," are in the site.

Site quality scores can be used by a ranking engine to rank search results. For example, the site quality score for a particular site can be used as a term in the computation of scores for resources that are in the particular site. For example, a site quality score for the site "http://www.example.com" can be used as a term in the computation of a score for a resource "http://www.example.com/resource.html" that is in the site.

Figure 3:
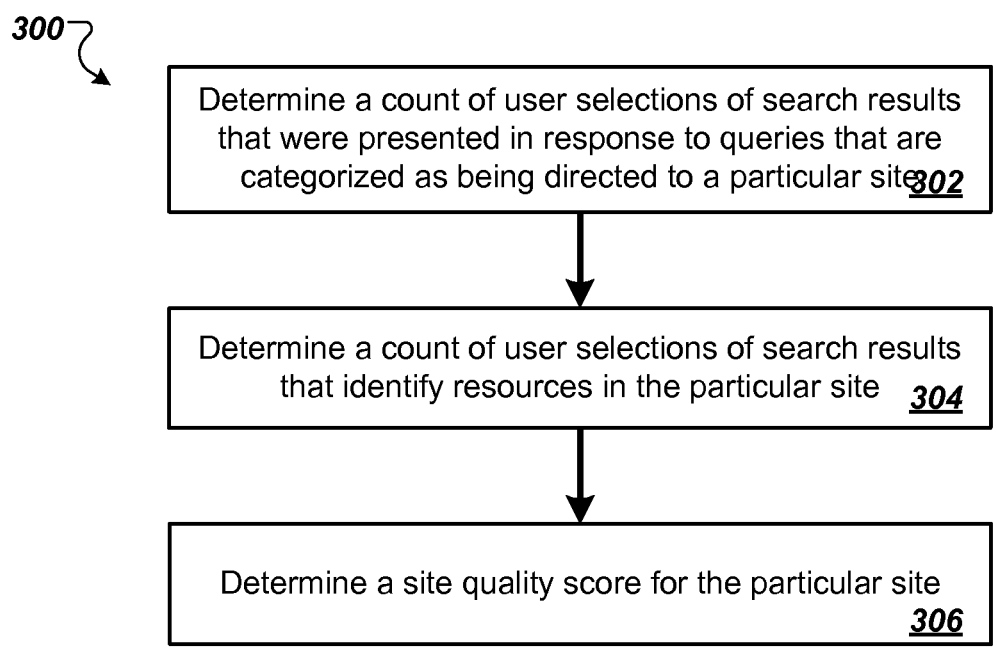
FIG. 3 is a flow diagram of another example process for determining a site quality score.

FIG. 3 is a flow diagram of another example process for determining a site quality score. For convenience, the process 300 will be described with respect to a system including one or more computing devices that performs the process 300. For example, a search system 114, as described in reference to FIG. 1, can be used to perform the process 300.

The system determines a count of user selections of search results that were presented in response to queries that are categorized as referring to a particular site (302). Depending on the configuration of the system, one or more of a mouse rollover, a click, a click of at least a certain duration, or a click of at least a certain duration relative to a resource length, for example, may be treated by the system as being a user selection.

The system can maintain a count of user selections of search results that were presented in response to queries that are categorized as referring to a particular site. For example, if the search system has data indicating that the terms "example sf" are commonly used by users to refer to a site "sf.example.com," the system can count the number of user selections that were received on search results that were presented in response to queries that contain the terms "example sf", e.g., the queries "example sf news" and "example sf restaurant reviews," both of which include a reference to the site "sf.example.com."

Generally, a user selection is any action received from a user, and made in connection with the presentation of search results, that causes the resource identified by a search result to be presented, at least in part, to the user. When the user device and search system are separate, such actions are detected on the user's device and data characterizing the actions are transmitted to the search system. Depending on the configuration of the system, one or more of a mouse rollover, a click, a click of at least a certain minimum duration, i.e., a selection after which the user views the resource for at least the certain minimum duration, or a click of at least a certain duration relative to a physical or temporal length of the resource, for example, may be treated by the system as being a user selection.

The system determines a count of user selections of search results that identify resources in the particular site (304), regardless of the content of the query to which the search results are a response.

The system determines a site quality score for the particular site (306). The site quality score for the particular site can be determined by using the ratios described in reference to FIG. 2, where the numerator is a function of the count of user selections of search results that were presented in response to queries that are categorized as referring to a particular site, and where the denominator is a function of the count of user selections of search results that identify resources in the particular site.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A method comprising:
   receiving a search query;
   obtaining a plurality of search results for the search query from a search engine, wherein each search result identifies a respective search result resource, and wherein the plurality of search results includes one or more search results that identify search result resources that are in a particular site;
   using a site quality score for the particular site to rank the plurality of search results; and
   determining the site quality score for the particular site, comprising:
      determining a numerator that is a function of a first count of textually unique queries submitted to the search engine that have been categorized as referring to the particular site, wherein each such textually unique query is counted once in the first count;
      determining a denominator that is a function of a second count of textually unique queries submitted to the search engine that have been associated with resources in the particular site, wherein each such textually unique query is counted once in the second count; and determining the site quality score for the particular site as a ratio of the numerator and the denominator.

2. The method of claim 1, wherein a query is associated with the particular site when the query is followed by a user selection of a search result that (a) was presented by the search engine in response to the query and (b) identifies a resource in the particular site.

3. The method of claim 1, wherein using the site quality score for the particular site to rank the plurality of search results comprises:

using the site quality score as a term in a computation of a respective ranking score for each of the search result resources that are in the particular site.

4. The method of claim 1, wherein the particular site is a collection of resources that are hosted on a particular server.

5. The method of claim 1, wherein the particular site is a collection of resources that are in a particular Internet address subdomain or in a particular subdirectory of the particular Internet address subdomain.

6. The method of claim 1, wherein two queries that have the same terms and differ only in the order of the terms are counted as the same unique query.

7. The method of claim 1, wherein two queries that have the same terms and differ only in the order of the terms are counted as the different unique queries.

8. A method comprising:

receiving a search query;

obtaining a plurality of search results for the search query from a search engine, wherein each search result identifies a respective search result resource, and wherein the plurality of search results includes one or more search results that identify search result resources that are in a particular site;

using a site quality score for the particular site to rank the plurality of search results;

categorizing as referring to the particular site each query that includes a site label identifying the particular site, wherein the site label is a term in the query that includes (i) an operator that identifies the term as a site label and (ii) a name of the particular site; and determining the site quality score for the particular site, comprising:

determining a numerator that is a function of a first count of unique queries submitted to the search engine that have been categorized as referring to the particular site;

determining a denominator that is a function of a second count of textually unique queries submitted to the search engine that have been associated with resources in the particular site; and determining the site quality score for the particular site as a ratio of the numerator and the denominator.

9. The method of claim 8, comprising:

categorizing as referring to the particular site each query that includes a term that has been determined to be a term that refers to the particular site.

10. The method of claim 8, comprising:

categorizing as referring to the particular site each query that has been determined to be a navigational query to the particular site.

11. A system comprising one or more computers and one or more storage devices storing instructions that when executed by the one or more computers cause the one or more computers to perform operations comprising:

receiving a search query;

obtaining a plurality of search results for the search query from a search engine, wherein each search result identifies a respective search result resource, and wherein the plurality of search results includes one or more search results that identify search result resources that are in a particular site;

using a site quality score for the particular site to rank the plurality of search results; and determining the site quality score for the particular site, comprising:

determining a numerator that is a function of a first count of textually unique queries submitted to the search engine that have been categorized as referring to the particular site, wherein each such textually unique query is counted once in the first count;

determining a denominator that is a function of a second count of textually unique queries submitted to the search engine that have been associated with resources in the particular site, wherein each such textually unique query is counted once in the second count; and determining the site quality score for the particular site as a ratio of the numerator and the denominator.

12. The system of claim 11, wherein a query is associated with the particular site when the query is followed by a user selection of a search result that (a) was presented by the search engine in response to the query and (b) identifies a resource in the particular site.

13. The system of claim 11, wherein using the site quality score for the particular site to rank the plurality of search results comprises:

using the site quality score as a term in a computation of a respective ranking score for each of the search result resources that are in the particular site.

14. The system of claim 11, wherein the particular site is a collection of resources that are hosted on a particular server.

15. The system of claim 11, wherein the particular site is a collection of resources that are in a particular Internet address subdomain or in a particular subdirectory of the particular Internet address subdomain.

16. The system of claim 11, wherein two queries that have the same terms and differ only in the order of the terms are counted as the same unique query.

17. The system of claim 11, wherein two queries that have the same terms and differ only in the order of the terms are counted as the different unique queries.

18. A system comprising one or more computers and one or more storage devices storing instructions that when executed by the one or more computers cause the one or more computers to perform operations comprising:

receiving a search query;

obtaining a plurality of search results for the search query from a search engine, wherein each search result identifies a respective search result resource, and wherein the plurality of search results includes one or more search results that identify search result resources that are in a particular site;

using a site quality score for the particular site to rank the plurality of search results;

categorizing as referring to the particular site each query that includes a site label identifying the particular site, wherein the site label is a term in the query that includes (i) an operator that identifies the term as a site label and (ii) a name of the particular site; and determining the site quality score for the particular site, comprising:
   determining a numerator that is a function of a first count of unique queries submitted to the search engine that have been categorized as referring to the particular site;
   determining a denominator that is a function of a second count of unique queries submitted to the search engine that have been associated with resources in the particular site; and
   determining the site quality score for the particular site as a ratio of the numerator and the denominator.

19. The system of claim 18, wherein the operations comprise:
   categorizing as referring to the particular site each query that includes a term that has been determined to be a term that refers to the particular site.

20. The system of claim 18, wherein the operations comprise:
   categorizing as referring to the particular site each query that has been determined to be a navigational query to the particular site.

21. A computer program product encoded on one or more non-transitory computer storage media, the computer program product storing instructions that when executed by the one or more computers cause the one or more computers to perform operations comprising:
   receiving a search query;
   obtaining a plurality of search results for the search query from a search engine, wherein each search result identifies a respective search result resource, and wherein the plurality of search results includes one or more search results that identify search result resources that are in a particular site;
   using a site quality score for the particular site to rank the plurality of search results; and
   determining the site quality score for the particular site, comprising:
      determining a numerator that is a function of a first count of textually unique queries submitted to the search engine that have been categorized as referring to the particular site, wherein each such textually unique query is counted once in the first count;
      determining a denominator that is a function of a second count of textually unique queries submitted to the search engine that have been associated with resources in the particular sites, wherein each such textually unique query is counted once in the second count; and
      determining the site quality score for the particular site as a ratio of the numerator and the denominator.

22. The computer program product of claim 21, wherein using the site quality score for the particular site to rank the plurality of search results comprises:
   using the site quality score as a term in a computation of a respective ranking score for each of the search result resources that are in the particular site.

23. The computer program product of claim 21, wherein two queries that have the same terms and differ only in the order of the terms are counted as the same unique query.

24. The computer program product of claim 21, wherein two queries that have the same terms and differ only in the order of the terms are counted as the different unique queries.

* * * * *